Oliver E. Randall's Horse Rake.

PATENTED FEB 4 1868

No. 74136

Witnesses.
Theo Inscho
Wo. Truwn

Inventor.
O. E. Randall
Per Munn & Co.
Attorneys

United States Patent Office.

OLIVER E. RANDALL, OF LEWISTON, MAINE.

Letters Patent No. 74,136, dated February 4, 1868.

IMPROVEMENT IN HORSE-RAKES.

The Schedule referred to in these Letters Patent and making part of the same.

TO ALL WHOM IT MAY CONCERN:

Be it known that I, OLIVER E. RANDALL, of Lewiston, in the county of Androscoggin, and State of Maine, have invented a new and improved Horse-Rake; and I do hereby declare that the following is a full, clear, and exact description thereof, which will enable others skilled in the art to make and use the same, reference being had to the accompanying drawings, and to the letters of reference marked thereon.

This invention relates to a new and improved horse-rake, and is an improvement on a rake, for which Letters Patent were granted to me, bearing date 23d May, 1865.

The present invention consists in the application of a separate and independent spring to each tooth-bar, and in a peculiar lifting-arrangement, as hereinafter fully shown and described, whereby the rake-teeth, as hitherto, are allowed to conform to the inequalities of surface over which they may pass, and the rake at the same time allowed to gather up and retain a large quantity of hay or grain before being discharged. In the accompanying sheet of drawings—

Figure 1:
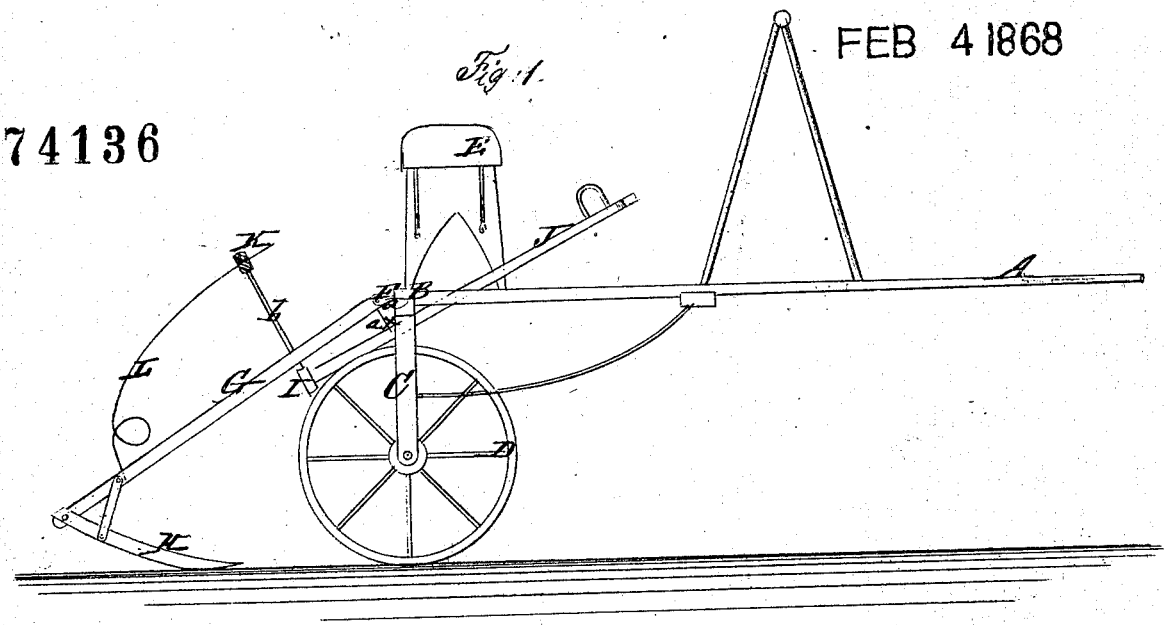

Figure 1 is a side view of my invention.

Figure 2:
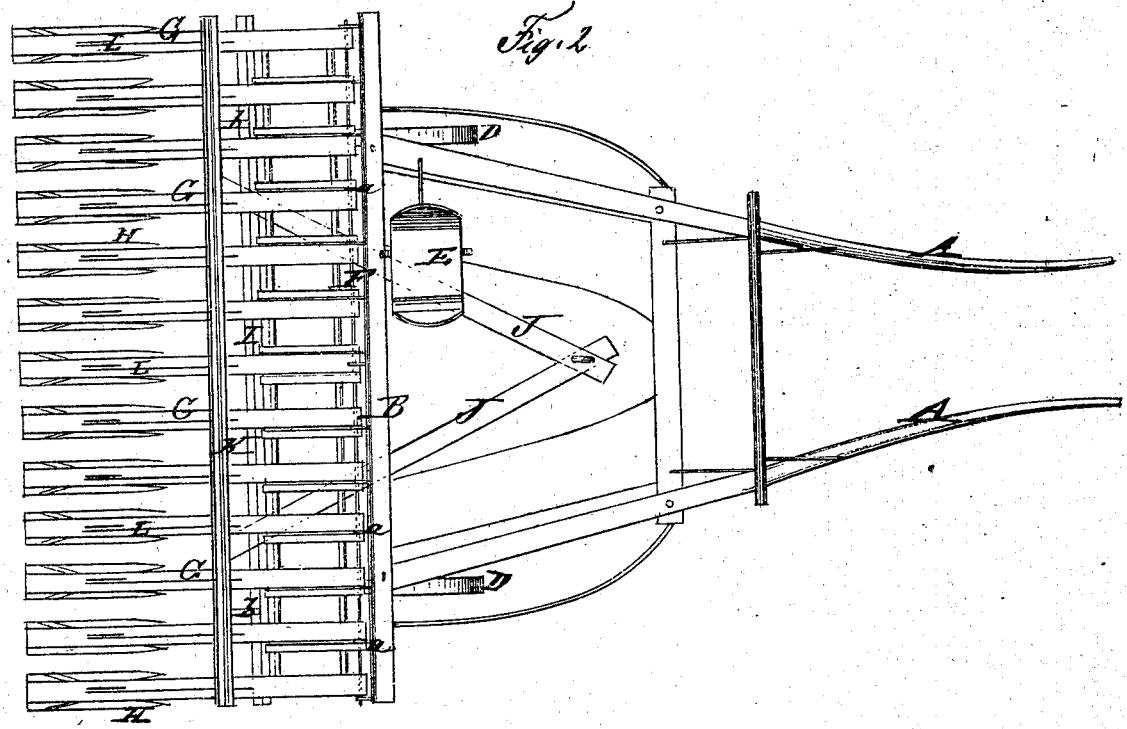

Figure 2, a plan or top view of the same.

Similar letters of reference indicate like parts.

A A represent the thills of the rake, the rear ends of the former being framed into a cross-bar B, which is provided near each end with pendants C, to which the axles of the wheels D are secured. E is the driver's seat, at the rear part of the thills, and F is a rod or shaft, which has its bearings, $a$, attached to the rear side of the cross-bar B of the thills. On this rod or shaft F there is fitted loosely a series of bars, G, the lower ends of which have the rake-teeth H attached to them. The position of the bars and rake-teeth, when the rake is at work, is shown clearly in fig. 1. I is a bar underneath the tooth-bars G, and into this bar I two oblique bars J J are framed, the latter being in contact and connected at their front ends, as shown in fig. 2, and connected to the rod or shaft F by bars $a^\times$. The bar I has two rods, $b\ b$, fitted in it, which project upward between the tooth-bars, and have a bar, K, secured on their upper ends. This bar K is perforated at equal distances apart to allow the ends of springs L to pass through, said springs being constructed of wire, and attached to the bars G, one to each. These springs keep the rake-teeth to their work, and at the same time admit of the teeth yielding or giving to the inequalities of surface over which they may pass; and when the rake has gathered up its load, the front ends of the bars J J are depressed or forced down. and the bar I is thereby raised, and also the tooth-bars G, and the load discharged.

Having thus described my invention, I claim as new, and desire to secure by Letters Patent—

1. The springs L, applied to the tooth-bars G and to the bar K, substantially in the manner as and for the purpose set forth.

2. The bar I, placed underneath the tooth-bars G, and connected to the oblique bars J J, which are secured to the rod or shaft F, when said bar I has the perforated bar K connected to it for the upper ends of the springs L to pass through, substantially in the manner as and for the purpose set forth.

OLIVER E. RANDALL.

Witnesses:
O. SWARTWOUT,
H. LINDSLY.